| (12) | United States Patent | (10) Patent No.: | US 12,344,565 B2 |
|---|---|---|---|
| | Shi et al. | (45) Date of Patent: | Jul. 1, 2025 |

(54) CMAS-RESISTANT ABRADABLE COATINGS

(71) Applicant: Rolls-Royce Corporation, Indianapolis, IN (US)

(72) Inventors: Jun Shi, Carmel, IN (US); Li Li, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/126,807

(22) Filed: Dec. 18, 2020

(65) Prior Publication Data

US 2021/0188721 A1    Jun. 24, 2021

Related U.S. Application Data

(60) Provisional application No. 62/950,716, filed on Dec. 19, 2019.

(51) Int. Cl.
| $C04B\ 41/50$ | (2006.01) |
| $C04B\ 41/00$ | (2006.01) |
| $C04B\ 41/45$ | (2006.01) |
| $C04B\ 41/52$ | (2006.01) |

(52) U.S. Cl.
CPC ........ *C04B 41/5024* (2013.01); *C04B 41/009* (2013.01); *C04B 41/4527* (2013.01); *C04B 41/52* (2013.01); *C04B 2235/3427* (2013.01); *Y10T 428/31504* (2015.04)

(58) Field of Classification Search
None
See application file for complete search history.

(56) References Cited

U.S. PATENT DOCUMENTS

| 4,269,903 | A | | 5/1981 | Clingman et al. |
| 4,422,648 | A | | 12/1983 | Eaton et al. |
| 4,503,130 | A | | 3/1985 | Bosshart et al. |
| 5,951,892 | A | * | 9/1999 | Wolfla ............... C23C 4/18 |
| | | | | 219/121.85 |

(Continued)

FOREIGN PATENT DOCUMENTS

| EP | 1642993 B1 | 11/2012 |
| EP | 2540973 A1 | 1/2013 |

(Continued)

OTHER PUBLICATIONS

Response to Extended Search Report dated May 17, 2021, from counterpart European Application No. 20215360.7 filed Dec. 23, 2021, 9 pp.

(Continued)

*Primary Examiner* — Humera N. Sheikh
*Assistant Examiner* — Elizabeth D Ivey
(74) *Attorney, Agent, or Firm* — Shumaker & Sieffert, P.A.

(57) ABSTRACT

In some examples, an article includes a ceramic or a ceramic or ceramic matrix composite (CMC) substrate; and an abradable coating on the CMC substrate. The abradable coating includes a plurality of first rare earth (RE) silicate layers in an alternating arrangement with a plurality of second RE silicate layers, wherein the first RE silicate layers include a rare earth monosilicate and the second RE silicate layers include a rare earth disilicate, and wherein the first RE silicate layers include a greater concentration of the rare earth monosilicate than the second RE silicate layers.

20 Claims, 10 Drawing Sheets

(56) References Cited

U.S. PATENT DOCUMENTS

| | | | |
|---|---|---|---|
| 6,358,002 | B1 | 3/2002 | Good et al. |
| 8,124,252 | B2 | 2/2012 | Cybulsky et al. |
| 8,172,519 | B2 | 5/2012 | Jarrabet et al. |
| 8,470,460 | B2 | 6/2013 | Lee |
| 8,658,255 | B2 | 2/2014 | Kirby et al. |
| 9,194,242 | B2 | 11/2015 | Lee |
| 9,713,912 | B2 | 7/2017 | Lee |
| 10,233,760 | B2 | 3/2019 | Lee |
| 10,808,565 | B2 | 10/2020 | Walston et al. |
| 10,858,950 | B2 | 12/2020 | Shi et al. |
| 10,871,078 | B2 | 12/2020 | Ndamka et al. |
| 11,506,073 | B2 | 11/2022 | Shi et al. |
| 11,566,531 | B2 | 1/2023 | Shi et al. |
| 2003/0138658 | A1 | 7/2003 | Taylor et al. |
| 2009/0324930 | A1 | 12/2009 | Tulyani et al. |
| 2010/0159151 | A1 | 6/2010 | Kirby et al. |
| 2013/0122259 | A1* | 5/2013 | Lee ............. C23C 28/048 428/164 |
| 2013/0189531 | A1* | 7/2013 | Lee ............. C09D 5/18 428/448 |
| 2013/0260132 | A1 | 10/2013 | Hazel et al. |
| 2014/0199163 | A1 | 7/2014 | Lee |
| 2016/0003092 | A1* | 1/2016 | Chamberlain .... C04B 35/62222 428/323 |
| 2017/0183782 | A1 | 6/2017 | Kirby |
| 2017/0314410 | A1 | 11/2017 | Liu et al. |
| 2018/0010469 | A1 | 1/2018 | Kadau et al. |
| 2018/0282851 | A1* | 10/2018 | Ndamka ............. C23C 28/321 |
| 2019/0032504 | A1 | 1/2019 | Shi et al. |
| 2019/0048475 | A1 | 2/2019 | Ndamka et al. |
| 2019/0092701 | A1 | 3/2019 | Gong et al. |
| 2019/0093497 | A1 | 3/2019 | Ndamka et al. |
| 2019/0330121 | A1 | 10/2019 | Pin et al. |
| 2020/0277871 | A1 | 3/2020 | Shi et al. |
| 2020/0102843 | A1* | 4/2020 | Bianchi ................. C23C 4/129 |
| 2020/0123071 | A1 | 4/2020 | Ndamka et al. |
| 2021/0188721 | A1 | 6/2021 | Shi et al. |
| 2021/0396150 | A1 | 12/2021 | Golden et al. |

FOREIGN PATENT DOCUMENTS

| | | | |
|---|---|---|---|
| EP | 3162783 | A1 | 5/2017 |
| EP | 3178799 | A1 | 6/2017 |
| EP | 3640360 | A1 | 4/2020 |
| FR | 2979664 | A1 | 3/2013 |

OTHER PUBLICATIONS

U.S. Appl. No. 17/065,127, filed Oct. 7, 2020, by Shi et al.

Office Action from U.S. Appl. No. 17/065,127, dated Mar. 10, 2022, 19 pp.

Schlegel et al., "Columnar-Structured Mg—Al-Spinel Thermal Barrier Coatings (TBCs) by Suspension Plasma Spraying (SPS)." Journal of thermal spray technology 24, Jan. 2015, pp. 144-151.

Extended Search Report from counterpart European Application No. 20215360.7, dated May 17, 2021, 8 pp.

Notice of Allowance from U.S. Appl. No. 17/065,127 dated Oct. 24, 2022, 5 pp.

Notice of Allowance from U.S. Appl. No. 17/065,127 dated Jun. 28, 2022, 8 pp.

Response to Office Action dated Mar. 10, 2022, from U.S. Appl No. 17/065,127, filed Jun. 10, 2022, 6 pp.

Communication pursuant to Article 94(3) EPC from counterpart European Application No. 20215360.7 dated Jan. 7, 2025, 6 pp.

Response to Communication pursuant to Article 94(3) EPC dated Jan. 7, 2025, from counterpart European Application No. 20215360.7 filed Apr. 30, 2025, 13 pp.

* cited by examiner

CMAS-RESISTANT ABRADABLE COATINGS

This application claims the benefit of U.S. Provisional Patent Application No. 62/950,716, filed Dec. 19, 2019, the entire content of which is incorporated by reference herein.

TECHNICAL FIELD

The disclosure relates to coatings on ceramic or ceramic matrix composite substrates and techniques for forming the same.

BACKGROUND

High temperature components such as engines face increasing performance demands at higher temperatures. Under certain operating conditions, siliceous materials such as airborne dust, sand, fly ash, volcanic dust, concrete dust, and fuel residue ingested into a high temperature component may accumulate on certain hot surfaces, for example, on blade, vanes, combustion tiles and turbine segments. These materials may fuse and melt when exposed to high temperatures, for example, temperatures above 1240° C., depending on the composition of the deposited materials. Calcium-magnesium-alumino-silicate (CMAS), is the general name given to these molten deposits, as the predominant oxides are calcia (CaO), magnesia (MgO), alumina ($Al_2O_3$) and silica ($SiO_2$).

Engine components may be coated with one or more barrier layers to provide protection against thermal flux, erosion, and/or environmental contamination, for example, by reducing or preventing CMAS formation, migration, or infiltration.

SUMMARY

In general, the present disclosure describes example abradable coatings including discrete first layers including a rare earth (RE) monosilicate and second layers including a RE disilicate, and techniques and systems for manufacturing the layered RE monosilicate/RE disilicate abradable coatings. The first layers may include a higher concentration of the RE monosilicate than the second layers (e.g., with the second layers including RE monosilicate but in a lower concentration than the first layers or the second layers including substantially no RE monosilicate). In various examples, the layered abradable coatings can maintain excellent CMAS and water vapor resistance at varying blade cut depths, while providing a good abradability as well as a good CTE match with the CMC substrate, which can lower thermal stress the coatings and in a CMC seal segment.

Thus, in some examples, the abradable coatings according to the present disclosure may allow high-temperature CMC components to more safely operate in relatively higher temperature, steamy, or dusty environments, and may provide better coating strength, better resistance to oxidation, water vapor, and CMAS attack, or combinations thereof.

In one aspect, the present disclosure is directed to an article comprising a ceramic or ceramic matrix composite (CMC) substrate; and an abradable coating on the CMC substrate, the abradable coating comprising a plurality of first rare earth (RE) silicate layers in an alternating arrangement with a plurality of second RE silicate layers, wherein the first RE silicate layers include a rare earth monosilicate and the second RE silicate layers include a rare earth disilicate, and wherein the first RE silicate layers include a greater concentration of the rare earth monosilicate than the second RE silicate layers.

In another aspect, the present disclosure is directed to a method comprising forming an abradable coating on a ceramic or CMC substrate, the abradable coating comprising a plurality of first rare earth (RE) silicate layers in an alternating arrangement with a plurality of second RE silicate layers, wherein the first RE silicate layers include a rare earth monosilicate and the second RE silicate layers include a rare earth disilicate, and wherein the first RE silicate layers include a greater concentration of the rare earth monosilicate than the second RE silicate layers.

In another aspect, the present disclosure is directed to an abradable system comprising a ceramic or CMC substrate, and an abradable coating on the CMC substrate, the abradable coating comprising a plurality of first rare earth (RE) silicate layers in an alternating arrangement with a plurality of second RE silicate layers, wherein the first RE silicate layers include a rare earth monosilicate and the second RE silicate layers include a rare earth disilicate, wherein the first RE silicate layers include a greater concentration of the rare earth monosilicate than the second RE silicate layers; and an opposing abrasive element acting on the abradable coating, wherein the abrasive element has a maximum penetration depth in the abradable coating, and wherein the abradable coating comprises at least one of the first RE silicate layer between the maximum penetration depth and the CMC substrate.

The details of one or more examples are set forth in the accompanying drawings and the description below. Other features, objects, and advantages will be apparent from the description and drawings, and from the claims.

BRIEF DESCRIPTION OF DRAWINGS

Like symbols in the drawings indicate like elements.

DETAILED DESCRIPTION

Figure 1:
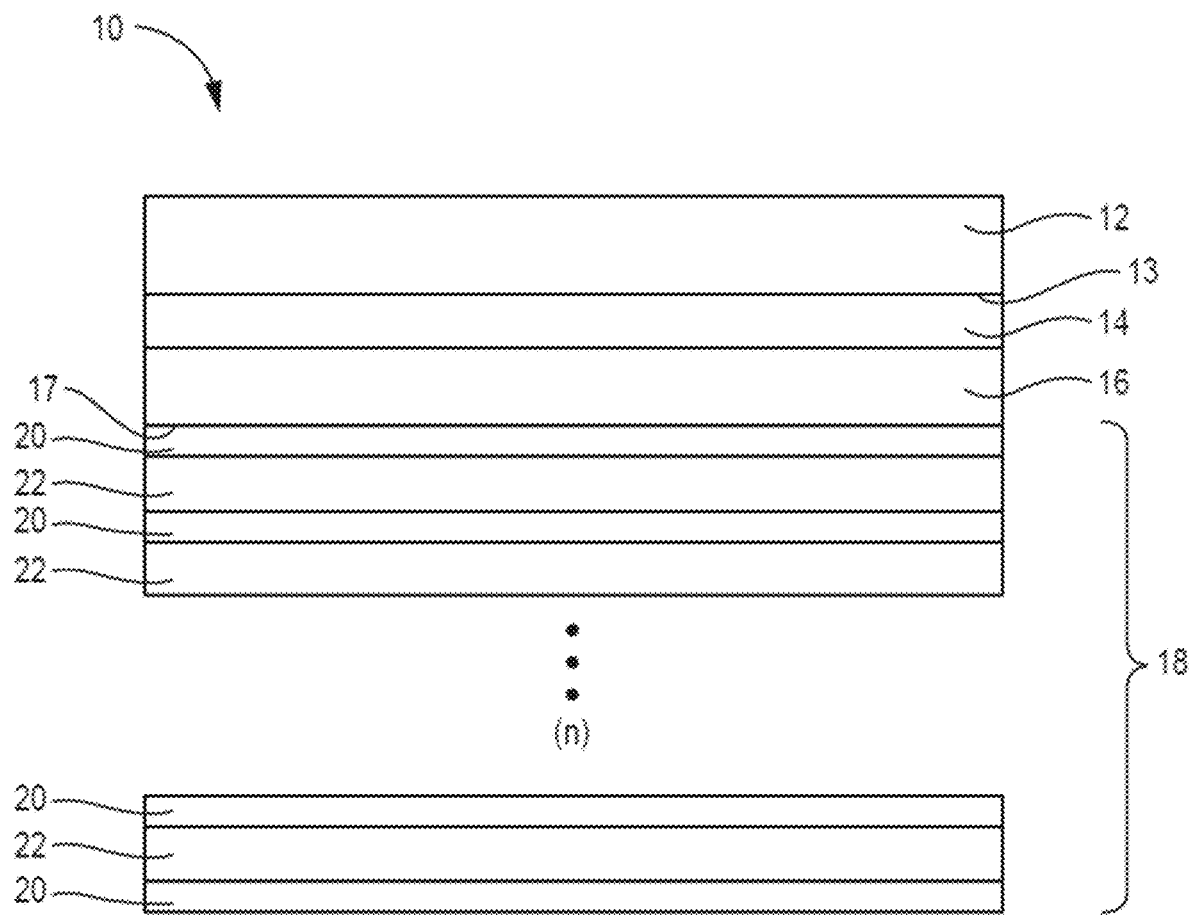
FIG. 1 is a schematic diagram of a ceramic matrix composite (CMC) article including a layered abradable coating.

As described above, engine components may be coated with one or more barrier layers to provide protection against thermal flux, erosion, and/or environmental contamination, for example, by reducing or preventing CMAS formation, migration, or infiltration. In some examples, environmental barrier coatings (EBCs) may be employed to protect Si-containing substrates such as SiC/SiC ceramic matrix composites (CMC) from water vapor attack. Rare earth silicates such as ytterbium disilicate (YbDS) have been used in EBCs for SiC based CMCs. Among other desirable attributes, YbDS has a good match of coefficient-of-thermal-expansion (CTE) with CMC.

In some examples, components including a ceramic or CMC substrate may also include an abradable layer in addition to an EBC layer. For example, CMC seal segments can include a layer of an abradable coating that blade tips cut into. To protect against airborne CMAS, the abradable coating should have high CMAS attack resistance. Rare earth (RE) monosilicates such as ytterbium monosilicate (YbMS) have good CMAS resistance, and can be used on the flow path side of the abradable coating.

In some cases, RE monosilicates such as YbMS, have a much higher CTE than RE disilicates such as YbDS, thereby potentially making a layer rich in RE monosilicates less compatible with the CMC substrate in terms of thermal expansion match. Such a mismatch in CTE can result in high thermal stresses. Due to manufacturing tolerances and relative thermal/mechanical deformation of the blades and CMC seal segments, the blade tip cut depth can vary from one seal segment to another, and from one turbine engine to another. For example, the designed nominal blade cut-depth can be 0.2 mm, but the deepest blade cut-depth could be as high as 0.4 mm. A deep blade cut can completely remove a protective layer of YbMS in an abradable coating, leaving an exposed region of the abradable coating with little or no YbMS, thus leaving the CMC substrate with a reduced resistance to CMAS and water vapor attack. In graded abradable coatings having increasing levels of YbDS closer to the CMC substrate, a deep blade cut can expose a region of the abradable coating with lower YbMS content, and therefore lower resistance to CMAS and water vapor.

The present disclosure describes example abradable coatings including discreet first layers including a rare earth (RE) monosilicate (e.g., a YbMS rich layer with at least 20 wt. % YbMS) and second layers including a RE disilicate (e.g., a YbDS rich layer with at least 50 wt. % YbDS), and techniques and systems for manufacturing the layered RE monosilicate/RE disilicate abradable coatings. In various examples, the layered abradable coatings can maintain excellent CMAS and water vapor resistance at varying blade cut depths, while providing a good CTE match with the CMC substrate, which can lower thermal stress in a CMC seal segment.

Thus, in some examples, the abradable coatings according to the present disclosure may allow high-temperature CMC components to more safely operate in relatively higher temperature, steamy, or dusty environments, and may provide better coating strength, better resistance to oxidation, water vapor, and CMAS attack, or combinations thereof.

In some examples, rare earth oxide (REO) rich phases may react with CMAS to form stable products that slow the reaction/infiltration/penetration rate of CMAS (e.g., apatite $Ca_2RE_8(SiO_4)_6O_2$, diopside $Ca(Mg, Al)[(Si, Al)_2O_6]$ and garnet $RE_6Mg_5Si_5O_{24}$). Thus, the abradable coating may resist or arrest CMAS infiltration through the abradable coating and restrict CMAS effects to only an outer region of the abradable coating, thus more effectively protecting the underlying CMC substrate.

In examples described herein, the layers of the multiple layer coating including the higher RE monosilicate concentration may provide for beneficial CMAS resistance. For example, an EBC with a higher YbMS content may trigger a faster reaction rate with CMAS which quickly produces a dense apatite layer to prevent further EBC dissolution in molten CMAS. Likewise, for an example coating with alternating between first layers of high RE monosilicate concentration and second layers of high RE disilicate concentration and lower RE monosilicate concentration may (or even no RE monosilicate), the first layers may advantageously provide such CMAS resistance while the second layers may allow for a desirable CTE of the coating with an underlying substrate. The porosity of the layers and/or relative thickness of the layers may be tailored to further provide for a desired CTE match and/or abradability of the coating, e.g., with the porosity and/or thickness of the second layers being increased relative to the first layers to provide for a desired CTE match with the underlying substrate and abradability of the coating while still providing CMAS resistance.

FIG. 1 is a conceptual cross-sectional view of an example article 10 including a substrate 12. Substrate 12 may be a ceramic or ceramic matrix composite (CMC) substrate. The article 10 may be a high-temperature component, for example, an industrial, automotive, or aeronautical component. In some examples, the article 10 includes a gas turbine engine component, or the like. For example, article 20 may include a part that forms a portion of a flow path structure, a seal segment, a blade track, an airfoil, a blade, a vane, a combustion chamber liner, or another portion of a gas turbine engine.

The substrate 12 may include a material suitable for use in a high-temperature environment. In some examples, substrate 12 may include a ceramic or a ceramic matrix composite (CMC). Suitable ceramic materials, may include, for example, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 12 includes a ceramic, the ceramic may be substantially homogeneous. In some examples, substrate 12 may be a reaction bonded silicon carbide (RBSiC) substrate.

In examples in which substrate 12 includes a CMC, substrate 22 may include a matrix material and a reinforcement material. The matrix material may include, for example, silicon metal or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or another ceramic material. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

Substrate 12 may be manufactured using one or more techniques including, for example, chemical vapor deposition (CVD), chemical vapor infiltration (CVI), polymer impregnation and pyrolysis (PIP), slurry infiltration, melt infiltration (MI), combinations thereof, or other techniques.

In the example of FIG. 1, an optional bond coating 14 is formed on all or a part of a surface 13 of the CMC article 10 to promote adherence or retention of additional barrier coatings on the CMC substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, e.g., there are no intermediate layers or coatings.

In some examples, as shown in FIG. 1, the bond coat 14 may be directly on the substrate 12. In other examples, one or more coatings or layers of coatings may be between the bond coat 14 and substrate 12.

The bond coat 14 may be between an optional environmental barrier coating (EBC) layer 16 and substrate 12 and may increase the adhesion of EBC layer 16 to substrate 12 and/or increase the adhesion of abradable coating 18 to substrate 12. In some examples, bond coat 14 may include silicon and take the form of a silicon bond layer. In some examples, bond coat 14 may include silicon, a metal silicide, RE monosilicate, RE disilicate, hafnium silicate, mullite, SiC, a metal oxide or a mixture thereof. Bond coat 14 may be in direct contact with the surface 13 of the substrate 12, and EBC layer 16. In some examples, bond coat 14 has a thickness of approximately 25 microns to approximately 250 microns, although other thicknesses are contemplated.

In examples in which substrate 12 includes a ceramic or CMC, bond coat 14 may include a ceramic or another material that is compatible with the material from which substrate 12 is formed. For example, bond coat 14 may include mullite (aluminum silicate, $Al_6Si_2O_{13}$), silicon metal or alloy, silica, a silicide, or the like. Bond coat 14 may further include other elements, such as a rare earth silicate including a silicate of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and/or scandium (Sc).

The composition of bond coat 14 may be selected based on the chemical composition and/or phase constitution of substrate 12 and the overlying layer (e.g., EBC layer 16 of FIG. 1). For example, if substrate 12 includes a ceramic or a CMC, bond coat 14 may include silicon metal or alloy or a ceramic, such as, for example, mullite.

In some cases, bond coat 14 may include multiple layers. For example, in some examples in which substrate 12 includes a CMC including silicon carbide, bond coat 14 may include a layer of silicon on substrate 12 and a layer of mullite, a rare earth silicate, or a mullite/rare earth silicate dual layer on the layer of silicon. In some examples, a bond coat 14 including multiple layers may provide multiple functions of bond coat 14, such as, for example, adhesion of substrate 12 to an overlying layer (e.g., EBC layer 16 of FIG. 1), chemical compatibility of bond coat 14 with each of substrate 12 and the overlying layer, a better coefficient of thermal expansion match of adjacent layers, or the like.

Bond coat 14 may be applied on substrate 12 using, for example, thermal spraying, e.g., air plasma spraying, high velocity oxy-fuel (HVOF) spraying, low vapor plasma spraying, suspension plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

In the example of FIG. 1, an optional environmental barrier coating (EBC) 16 is on the optional bond coating 14, or on all or a portion of the surface 13 of the CMC substrate 12, to provide, for example, protection of the CMC from excess heat, CMAS, water vapor attack, and the like. The EBC layer 16 may include at least one of a rare-earth oxide, a rare-earth silicate, an aluminosilicate, or an alkaline earth aluminosilicate. For example, EBC 16 may include mullite, barium strontium aluminosilicate (BSAS), barium aluminosilicate (BAS), or strontium aluminosilicate (SAS). In some examples, EBC 16 may include at least one rare-earth oxide, at least one rare-earth monosilicate ($RE_2SiO_5$, where RE is a rare-earth element), at least one rare-earth disilicate ($RE_2Si_2O_7$, where RE is a rare-earth element), or combinations thereof. The rare-earth element in the at least one rare-earth oxide, the at least one rare-earth monosilicate, or the at least one rare-earth disilicate may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

The EBC layer 16 may be any suitable thickness. For example, EBC layer 16 may be about 5 mils (about 127 micrometers) to about 10 mils (about 2540 micrometers). In examples in which the EBC layer 16 is a non-abradable layer, layer 16 may have a thickness of about 1 mil (about 25.4 micrometers) to about 5 mils (about 127 micrometers). In other examples, the EBC layer 16 may have a different thickness.

Abradable coating 18 resides on a surface 17 of the barrier coating layer 16. In one example, an abradable coating on a flow path surface above the moving metal blade tips in a turbine engine can reduce over tip leakage and improve efficiencies. For example, a rotating part can erode a portion of a fixed abradable coating applied on an adjacent stationary part to form a seal having a very close tolerance. In an example, which is not intended to be limiting, abradable coatings are used in aircraft jet engines in the compressor and turbine sections where a minimal clearance is needed between the blade tips and a casing. For example, an abradable coating can be used to minimize the clearance between blade tips and an inner wall of an opposed shroud, which can reduce leakage or guide leakage flow of a working fluid, such as steam or air, across the blade tips, and thereby enhance turbine efficiency.

The abradable coating 18 includes at least one discrete first layers 20 including a rare-earth (RE) monosilicate (e.g., with an amount of at least about 20 wt % RE monosilicate) in an alternating arrangement with at least one discrete second layers 22 including RE disilicate (e.g., with an amount of at least about 50 wt % RE disilicate). For example, the alternating arrangement may be such that a single first layer 20 is followed by a single second layer 22, which is followed by a single first layer 20, and then followed by a single second layer 22, and so forth, as shown in FIG. 1. Silicate may refer to a synthetic or naturally-occurring compound including silicon and oxygen, and rare-earth (RE) may refer to rare earth elements including lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and/or scandium (Sc), and mixtures and combinations thereof.

As described herein, first layers 20 (also referred to as RE monosilicate rich layers 20) may include a higher concentration of RE monosilicate compared to that of second layers 22. For example, first layers 20 may include a higher concentration of the RE monosilicate than second layers 22 with second layers 22 including RE monosilicate but in a lower concentration than first layers 20 or second layers 20 including substantially no RE monosilicate. The RE monosilicate content in first layers 20 may improve the CMAS resistance of abradable coating 18, e.g., with the higher YbMS content potentially triggering a faster reaction rate with CMAS which quickly produces a dense apatite layer to prevent further coating dissolution in molten CMAS.

In various examples, the first layers 20 may include at least about 20 wt. % rare earth monosilicate, e.g., with greater than about 30 wt %, greater than about wt vol %, greater than about 50 wt %, greater than about 60 wt %, greater than about 70 wt %, greater than about 80 wt %, greater than about 90 wt % of one or more RE monosilicates, e.g., with the remainder being rare earth disilicate or a combination of RE disilicate and REO. In some examples, first layers 20 may consist essentially of one or more RE monosilicates, or may consist of one or more RE monosilicates. In the present application the term consist essentially of permits inclusion of components (for example, impurities such as less than 5 wt % trace phases of un-reacted components like RE oxide, RE disilicate, silica, and alumina) that do not materially affect the basic and novel characteristics of the RE monosilicate layer 20. In some examples, first layers 22 may additionally include another rare earth oxide with the RE monosilicate to further improve the CMAS resistant properties of coating 18. The composition of each individual layer of first layers 20 in abradable coating 18 may be substantially the same as the other first layers 20 or the composition may vary (e.g., the concentration of RE monosilicate may vary between layers).

Similarly, in various examples, the second layers 22 including the RE disilicate can independently include at least about 50 wt. % such as, e.g., greater than about 60 wt %, greater than about 70 wt %, greater than about 80 wt %, greater than about 90 wt % of one or more RE disilicates, e.g., with the remainder being RE monosilicate. In some examples, second layers 22 may consist essentially of one or more RE disilicates, or may consist of one or more RE disilicates. In some examples, second layers 22 may include an amount of RE monosilicate or may be substantially free of RE monosilicate. The composition of each individual layer of second layers 22 in abradable coating 18 may be substantially the same as the other second layers 22 or the composition may vary (e.g., the amount of RE disilicate and/or RE monosilicate may vary between layers). The RE disilicate content in second layers 22 may provide for an improved CTE match with substrate 20, e.g., as compared to the CTE of first layers 20.

The porosity of at least one layer of first layers 20 and second layers 22 may be relatively high (e.g., up to 60%) to provide for abradability of coating 18. In some examples, second layers 22 may have a greater porosity than first layers 20, e.g., to improve the abradability of abradable coating 18 while the less porous first layers 20 provide CMAS resistant. For examples, second layers 22 may have a porosity of at least 5%, such as about 10% to about 60%, about 10% to about 40%, or about 15% to about 40%, with first layers 20 have a lower porosity (e.g., less than about 15% or less than about 10%, such as about 1% to about 15% or about 1% to about 10% or about 1% to about 5%). First layers 20 may be more hermetic than second layers 22 to provide CMAS resistance or other environmental protection to underlying substrate 12. As will be described below, the porosity of second layers 22 may be generated during a thermal spray process to form the respective layers by including a fugitive material such as polyester that is burned off from the layers after deposition to create the porosity in the layers.

In various example examples, the RE monosilicates and disilicates in the layers 20, 22 of the abradable coating 18 include, but are not limited to, rare earth elements such as ytterbium, scandium, yttrium, lutetium, and mixtures and combinations thereof. In some examples, the RE silicates include ytterbium monosilicate (YbMS) and ytterbium disilicate (YbDS). In some examples, the RE silicates include yttrium monosilicate and yttrium disilicate.

In some examples, the layers 20, 22 of the abradable coating 18 can further include rare-earth oxide (REO) in excess of stoichiometric RE disilicate, or in excess of stoichiometric RE monosilicate. In some examples, the discrete layers 20, 22 of the abradable coating 18 can further include additional silicates such as, for example, barium strontium aluminum silicate, and the like. In some examples, the inclusion of REO with RE monosilicate in first layers 20 may improve the CMAS resistance of first layers 20, as described above.

In addition to the RE monosilicates, RE disilicates, and RE oxides, any of the layers 20, 22 making up the abradable coating 18 can include a wide variety of abradable ceramic materials including, but not limited to, aluminum nitride, aluminum diboride, boron carbide, aluminum oxide, mullite, zirconium oxide, carbon, silicon carbide, silicon nitride, transition metal nitrides, transition metal borides, and mixtures and combinations thereof.

The CMC substrate 12 and the layers 20, 22 of the abradable coating 18 each possess a respective coefficient of thermal expansion (CTE), and the layered structure of abradable coating 18 makes possible the tailoring of the CTE at a selected interface in the CMC article 10. The CTE of the individual layers 20, 22 of the abradable coating 11 may be controlled based on the volumetric density and volumetric distribution of RE monosilicate, RE disilicate, RE oxide, and other components in each layer as well as layer thicknesses. A relatively close CTE match with substrate 12 by tailoring the properties of layers 20 and 22 in coating 18 while still providing an abradable coating with relatively high CMAS resistance (e.g., by tailoring the RE monosilicate concentration in the respective layer, and/or the relatively thickness/porosity of first and second layers 20, 22. In one example, coating 18 may exhibit improved CTE match with substrate 12 as well as desirable abradability by increasing the thickness and porosity of second layers 22 while also exhibiting desirable CMAS resistance due to the composition (e.g., with relatively high RE monosilicate) of first layer 20. A close CTE match (e.g., less than 20%, or less than 10%, or less than 5% difference) may be useful to preserve the integrity of the abradable coating 18, and may reduce separation, cracking, or spallation of the abradable coating 18. Furthermore, the alternating layer structure of coating 18, e.g., with multiple first layers 20 and multiple second layer 22, may reduce crack propagation and/or provide for management of thermal stress of coating 18 on substrate 12, e.g., as compared to a coating with only one first layer 20 and/or only one second layer 22.

In some examples, the relative volumetric proportion of RE monosilicate to that of RE disilicate in a particular layer 20, 22 of the abradable coating 18 may influence the CTE in that layer. For example, as the volumetric proportion of RE disilicate increases, the overall CTE may decrease. For example, a region with 10% by volume of YbMS and 90% by volume of YbDS may exhibit an overall lower CTE of $5.0 \times 10^{-6}/°$ C., while a region with 90% by volume of YbMS and 10% by volume of YbDS may exhibit an overall higher CTE of $7.2 \times 10^{-6}/°$ C. In some examples, altering the overall CTE of layers 20, 22 with tailored thickness of each layer in may result in the CTE of the abradable coating 18 being closer to the CTE of the CMC substrate 12, reducing thermal stresses and promoting the retention of the abradable coating 18 on the CMC substrate 12. As described herein, the alternating architecture of coating 18 with multiple first layers 20 and multiple second layers 22 may provide for better thermal stress management compared to a two layer structure. For example, by providing an alternating coating, each respective layer may be thinner than a comparable one or two layer structure but the use of more total layers results in the same total amount of material (e.g., RE monosilicate and/or RE disilicate) for the layers with reduced thermal stress compared to a coating with fewer layers and thicker layers.

Properties, for example, physical, chemical, or mechanical properties, of the layers 20, 22 and their neighboring layers may depend on the relative RE monosilicate, RE disilicate and RE oxide composition of individual layers and their neighboring layers. In one non-limiting example, the equilibrium phase compositions of systems including RE oxides and RE silicates (monosilicates or disilicates) at different temperatures may be determined using a phase diagram of an ytterbia (ytterbium oxide)-silica (silicon oxide) system.

As an example, the estimated coefficient of thermal expansion (CTE) of phases including different concentrations of ytterbium monosilicate (YbMS) and ytterbium disilicate (YbDS) is set forth in TABLE 1.

TABLE 1

| Vol % YbMS | 10 | 20 | 30 | 40 | 50 | 60 | 70 | 80 | 90 |
|---|---|---|---|---|---|---|---|---|---|
| Vol % YbDS | 90 | 80 | 70 | 60 | 50 | 40 | 30 | 20 | 10 |
| Estimated Overall CTE ($\times 10^6$/° C.) | 5.0 | 5.3 | 5.5 | 5.8 | 6.1 | 6.4 | 6.7 | 6.9 | 7.2 |

In some examples, the abradable coating 18 includes at least one first layer 20 including in RE monosilicate and one second layer 22 including RE disilicate and less RE monosilicate, e.g., with the layers 20, 22 arranged such that one of the RE monosilicate rich layer 20 or one of the second layers 22 is nearest substrate 12 and another of the RE monosilicate rich layers 20 is the top layer of coating 18, e.g., as the topcoat of article 10. In one example, the abradable coating 18 includes 2 to 100, or 4 to 50, or 10 to 20, alternating layers 20, 22. In some examples, abradable coating 18 is arranged such that a RE monosilicate rich layer 20 is nearest the CMC substrate 12. In another example, the abradable coating 18 includes at least one first layer 20 rich in RE monosilicate sandwiched between one or more second layers 22 including RE disilicate and less RE monosilicate, with the layers 20, 22 arranged such that the RE monosilicate rich layer 20 is nearest the CMC substrate 12. In other examples, one or more second layers 22 may be nearest substrate 12 compared to first layers 20. In an example in which coating 18 includes multiple individual first layers 20 alternating with multiple individual second layers 22, a respective first layer 20 may be the nearest to substrate 12 in the stack of layers and/or a respective first layer 20 may form the top layer in coating 18 (e.g., as the topcoat of article 10).

While the layers 20, 22 may be substantially planar, some or all of the layers 20, 22 may be made partially or completely non-planar as needed to conform to a shape of a CMC article or to provide a desired CTE match for a particular region of a surface of a CMC article. For example, one or more of the layers 20, 22 may deviate from planarity, and have any suitable shape or follow any suitable contour, such as planar, undulating, zig-zag, corrugated, or curved, or combinations thereof.

In some examples, the RE monosilicate rich layers 20 have an average thickness of about 1.5 mils (0.04 mm) and second layers 22 have an average thickness of about 2 mils (0.05 mm). In some examples, RE monosilicate rich layers 20 have an average thickness of at least about 1 mil such as about 1 mil to about 100 mils or about 1 mil to about 5 mils, and second layers 22 have an average thickness of at least about 1 mil, such as about 1 mil to about 100 mils or about 2 mils to about 15 mils. The overall total thickness of the abradable coating 18 including all of RE monosilicate rich layers 20 and all of second layers 22 may be about 0.25 mm to about 2 mm or at least about 1 mils, such as, about 1 mil to about 100 mils or about 10 mils to about 80 mils or about 20 mils to about 60 mils.

In some examples, second layers 22 may be thicker than first layers 20, e.g., in cases in which second layers 22 have a greater porosity than first layers 20 to improve the abradability of second layers 22 and abradable coating 18 overall. In some examples, the individual second layers 22 may be about twice, about three times, or more than three times as thick as the individual first layers 20.

Figure 2:
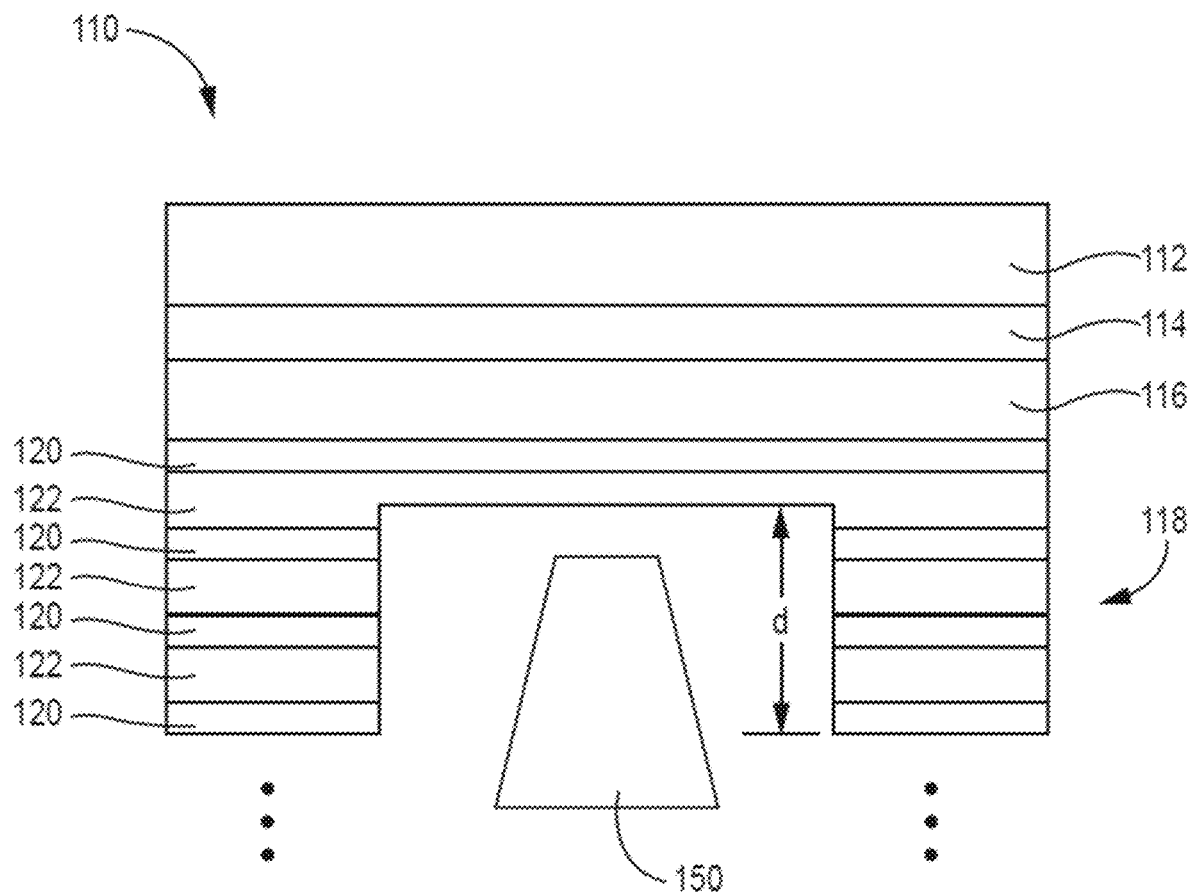
FIG. 2 is a schematic diagram of a ceramic matrix composite (CMC) article including a layered abradable coating, which illustrates a cut made by a rotating element.

In various examples, the number of discrete layers 20, 22 in the abradable coating 18, as well as the arrangement of the layers 20, 22, needed in a particular application may be determined by the penetration or rub depth of a blade or other rotating element contacting the abradable coating 18. For example, referring now to FIG. 2, a CMC article 110 includes a CMC substrate 112, an optional bond coat 114, and a barrier coating 116. An abradable coating 118 resides on the barrier coating 116, and includes an alternating arrangement of discrete first layers 120 rich in RE monosilicate and second layers 122 including RE disilicate and less RE monosilicate, with the layer 120 rich in RE monosilicate proximal the CMC substrate 112. As shown schematically in FIG. 2, a rotating element 150 makes a cut in the abradable coating 118 with a maximum cut depth d. The first layer 120 rich in RE monosilicate and closest to the CMC substrate 112 is positioned at a depth deeper than the maximum cut depth d of the rotating element 150, so that there is at least one undisturbed first layer 120 rich in RE monosilicate after the deepest cut made by the rotating element 150. The continuous and undisturbed first layer 120 rich in RE monosilicate can help to maintain CMAS resistance.

Figure 3:
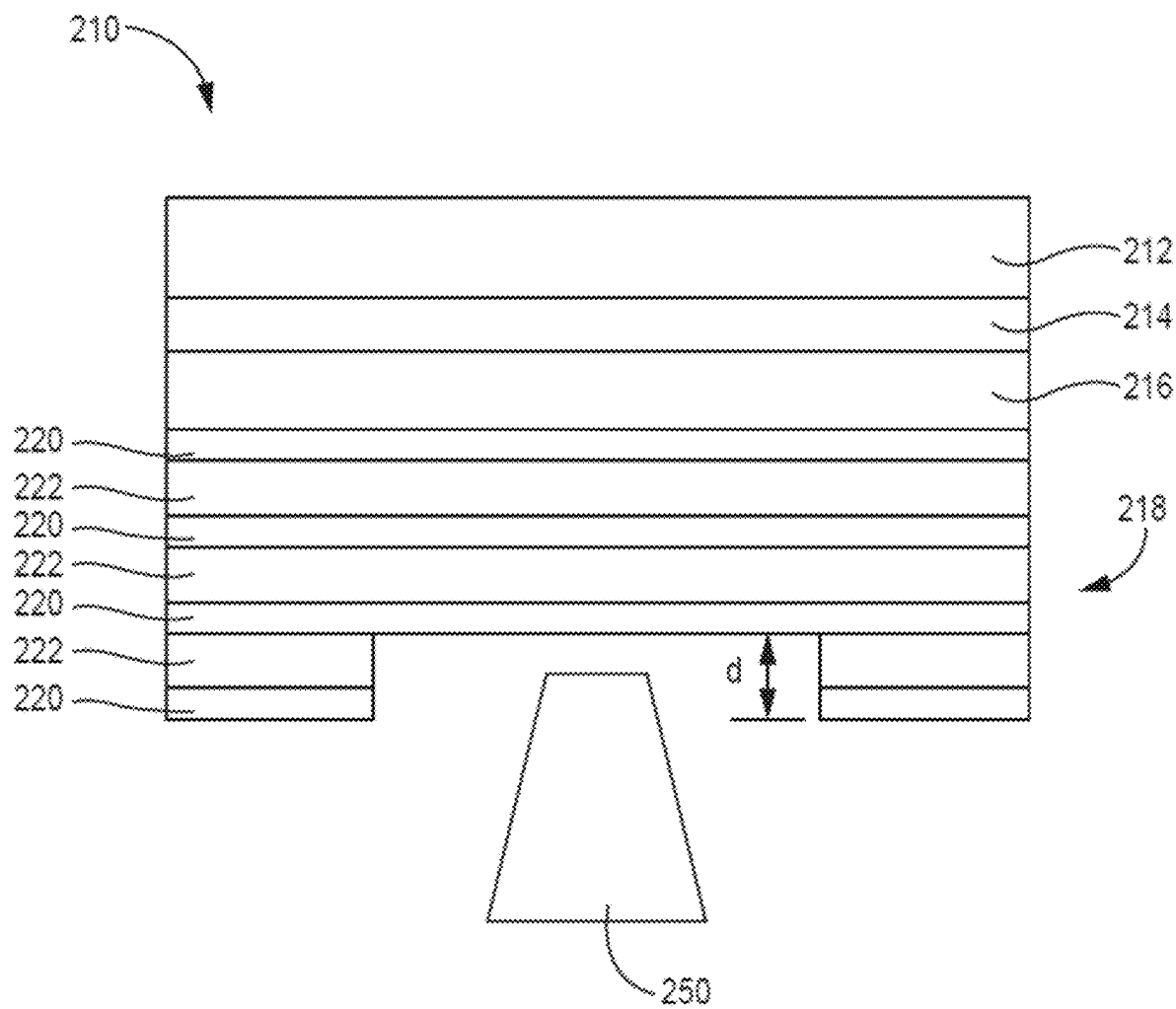
FIG. 3 is a schematic diagram of a ceramic matrix composite (CMC) article including a layered abradable coating, which illustrates a cut made by a rotating element.

In another example shown schematically in FIG. 3, a CMC article 210 includes a CMC substrate 212, an optional bond coat 214, and a barrier coating 216. An abradable coating 218 resides on the barrier coating 216, and includes an alternating arrangement of discrete first layers 220 rich in RE monosilicate and second layers 222 including RE disilicate with less RE monosilicate, with the first layer 220 rich in RE monosilicate proximal the CMC substrate 212. As shown schematically in FIG. 3, a rotating element 250 makes a cut in the abradable coating 218 with a maximum cut depth d. As in the example of FIG. 2, the first layer 220 rich in RE monosilicate and closest to the CMC substrate 212 is positioned at a depth deeper than the maximum cut depth d of the rotating element 250, so that there is at least one undisturbed first layer 220 rich in RE monosilicate after the deepest cut made by the rotating element 250. As in FIG. 2, the continuous and undisturbed first layer 220 rich in RE monosilicate can help to maintain CMAS resistance. However, in the case of the relatively shallow blade cut depth of FIG. 3, the alternating layered structure of the abradable coating 218 helps to manage the thermal stress due to thermal expansion mismatch between the layers 220 and 222.

Referring again to FIG. 1, the layers of the CMC article 10 may be formed by wide variety of techniques. For example, the optional bond coat 14 may be formed on the CMC substrate 12 by vapor deposition, spraying, and the like. The barrier coating 16 and the layers 20, 22 of the abradable coating 18 may be formed by one or more of vapor deposition, slurry deposition, electrophoretic deposition, or thermal spraying, for example, air plasma spray, low pressure plasma spray, suspension plasma spray, or high velocity oxy-fuel (HVOF) spraying.

For example, the concentration of RE monosilicate rich layers 20 and RE disilicate rich layers 22 in the abradable coating 18 can be adjusted by controlling spray gun parameters, such as hydrogen flow rate, gun current, standoff distances, and feedstock powder morphologies and sizes. The forming process may include a continuous process without stopping the gun or may include multiple spray runs.

In some examples, the process of forming the layers 20, 22 of the abradable coating 18 may include thermal spraying substantially pure (e.g., less than 5 vol. % trace phases of un-reacted RE earth oxide, RE monosilicate, silica, and alumina) RE disilicate feedstock material and controlling the thermal spray parameters (e.g., gun current, primary argon flow rate and secondary hydrogen flow rate) to achieve the desired coating composition (e.g., REO-rich phase content) by volatizing silica from the RE disilicate feedstock material during plasma spray process. In other examples, the layers 20, 22 may be formed by thermal spraying feedstock material that includes RE disilicate and RE monosilicate and/or RE oxide. The thermal spray parameters may be controlled to achieve the desired coating composition by controlling an amount of silica volatized from the feedstock material.

In another example, a slurry may be deposited using painting, dip coating, spraying, or the like, followed by drying and sintering. The slurry particles may include the desired composition of the final coating, or may include precursors, such as Si-rich particles and/or rare earth oxide-rich particles, that react during the sintering process to form the coating with a desired composition, gradient, and the like.

In some examples, layers 20, 22 may be formed by blending powder with stoichiometric RE disilicate (for example, ytterbium disilicate), stoichiometric RE monosilicate (for example, ytterbium monosilicate), and/or stoichiometric RE oxide (for example, ytterbium oxide) in a predetermined ratio before spraying or slurry coating the blend. Similarly, by selecting powder size and morphology used to form a slurry, the resulting microstructure of the coating may be controlled.

In another examples, the layers 20, 22 may be formed by a surface reaction or sol-gel infiltration.

As described herein, in some examples, layers 20 and 22 may be formed using a thermal spray process. Example thermal spray processes may include suspension plasma spray, low pressure plasma spraying, plasma spray physical vapor deposition, and air plasma spraying. Suitable example thermal spray systems for performing the thermal spray process may include those deposition systems described in U.S. Published patent application Ser. No. 16/884,841 filed May 27, 2020 by Li et al., and U.S. Published patent application Ser. No. 16/804,437 filed Feb. 28, 2020 by Bolcavage et al. Other thermal spray systems are contemplated.

In some examples, the same powder may be used to form both first layers 20 and second layers 22 using a thermal spray process despite the different composition and/or microstructure of layers 20 and 22. For example, a RE disilicate powder may be deposited by a thermal spray process, and the processing parameters may be control to selectively burn out silica from the RE disilicate powder to provide for RE monosilicate (e.g., when forming first layers 20 from the RE disilicate powder). In some examples, the amount of silicate burned out of the RE disilicate powder during the deposition process is determined by the heating of the powder during deposition. As increase in heating may increase the amount of silica burned off and, thus, an increase in the amount of RE monosilicate in the resulting coating. Conversely, a decrease in the heating of the RE disilicate powder during the thermal spray process may burn less silica and, thus, results in less RE monosilicate and greater RE disilicate in the resulting coating. The heating of the powder may be controlled by controlling the spray gun power (e.g., gun current is increased to increase heat) and/or gas flow rate (e.g., flow decreased to allow powder a longer dwelling time in the hot plasma plume during deposition).

Additionally, or alternatively, first and second layers 20, 22 may be formed by thermal spraying feedstock material that includes RE disilicate and RE monosilicate and/or RE oxide. The thermal spray parameters may be controlled to achieve the desired coating composition by controlling an amount of silica volatized from the feedstock material.

In some examples, a fugitive material may be employed during the deposition process (e.g., thermal spray process) to increase the porosity, e.g., of second layers 22. The fugitive material may be a material such as polyester that is burned off from a deposited layer to leave open pores in layers 22 after being formed. In some examples, the fugitive material is added to the feedstock powder. In other examples, the fugitive material may be added as a separate stream from that of the feedstock powder sprayed from a thermal spray gun. In this manner, the same feedstock powder may be used throughout the deposition process with the fugitive material being selectively introduced when second layers 22 are being formed to provide for more porous layers in coating 18 the manner described herein. In other examples, the fugitive material may be added directly to the powder feedstock and the powder being switched depending on which layer 20 or 22 is being deposited.

In some examples, the deposition techniques described herein may beneficially allow for the chemistry (composition), thickness and porosity of each layer 20, 22 to be readily tuned independently.

EXAMPLES

Various tests were carried out to evaluate one or more aspects of the present disclosure. However, the disclosure is not limited by the testing or the corresponding description.

In a first instance, a sample was prepared with about 20 layers alternating between higher YbMS content and lower YbMS content on a RBSiC substrate. The higher YbMS content layers had a thickness of approximately 2 mils and a YbMS content of approximately 55 wt. % with the remainder being YbDS. The lower YbMS layers had a thickness of approximately 4 mils and a YbMS content of approximately 11 wt. % with the remainder being YbDS.

Figure 4C:
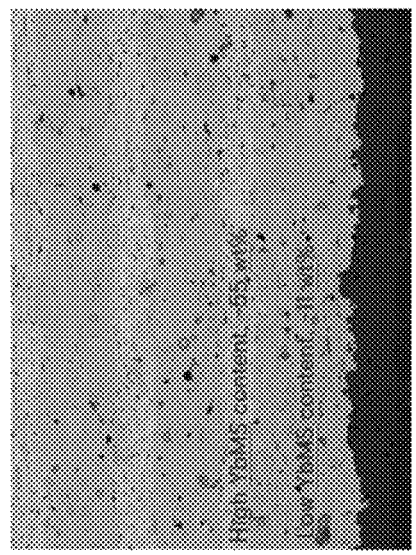
FIG. 4A to FIG. 12 are various SEM images related to example testing carried out to evaluate aspects of some examples of the disclosure.
Figure 4B:
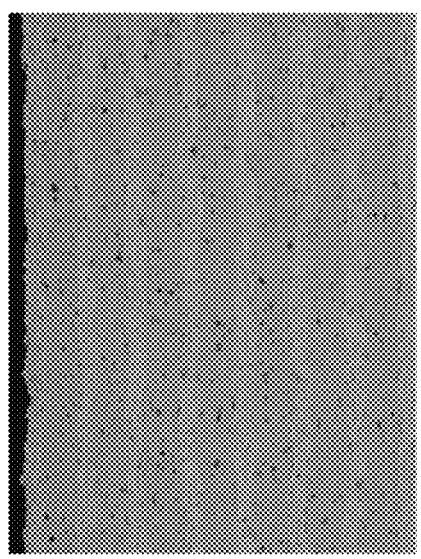
Figure 4A:
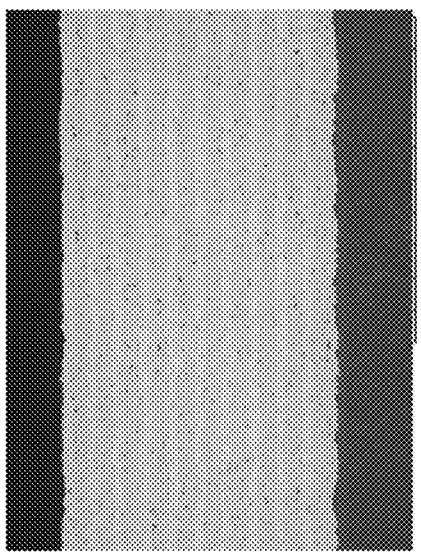

FIGS. 4A-4C are scanning electron micrograph (SEM) images showing cross-sections of the sample at various magnifications. The darker gray layers are the lower YbMS layers and the lighter gray layers are the higher YbMS layers. The silicon bond coat and substrate are on the bottom of the alternating layers. The images of FIGS. 4A-4C illustrate example microstructure of the alternating layered architecture in accordance with some examples of the disclosure.

Another sample was prepared having a layered architecture with alternating higher and lower YbMS layers on an RBSiC substrate similar to that of the sample described above. The RBSiC substrate had a relatively low strength and cracks were then initiated in the RBSiC substrate. It was found that the cracks were arrested within the layered coating on the substrate. This indicted that the alternating layered coating design had improved damage tolerance and toughness.

Another series of samples was prepared with an example coating on a CMC substrate. The coatings included a silicon bond layer (3.6 mils) on the substrate. A 6 mil thick EBC layer was formed on the silicon bond layer. The composition of the EBC layer was approximately 11 wt. % YbMS with the remainder being YbDS (referred to as a "Type B" composition). On the EBC layer, 19 layers alternating between 2 mils thick Type D composition and 4 mils thick Type B composition were deposited to a total thickness of 56 mils. The Type D composition had approximately 55 wt. % YbMS with the remainder being YbDS. The coating included a total of 21 layers on the substrate. The layers were deposited using a plasma spray process and were heat treated (about 2 hours at 1200 degrees Celsius) following deposition. The porosity of the Type D layers was about 4% and the porosity of the Type B layers was about 1.8% (more hermetic).

Figure 5:
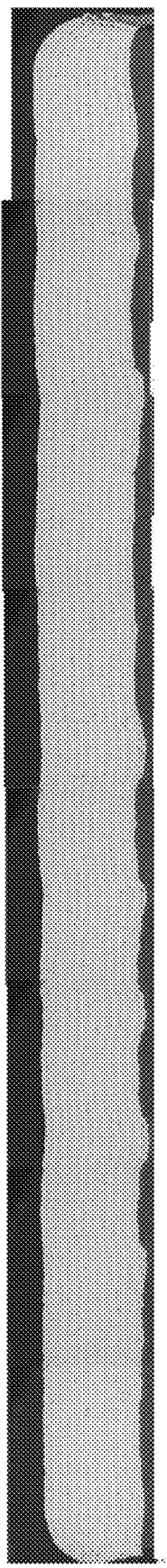
Figure 6A:
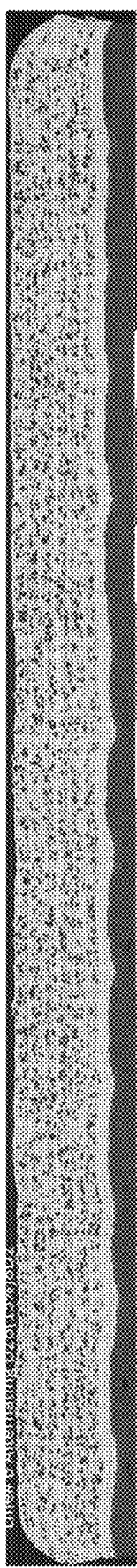
Figure 7A:
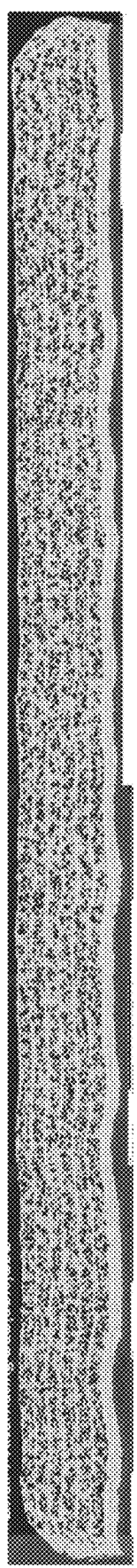
Figure 7B:
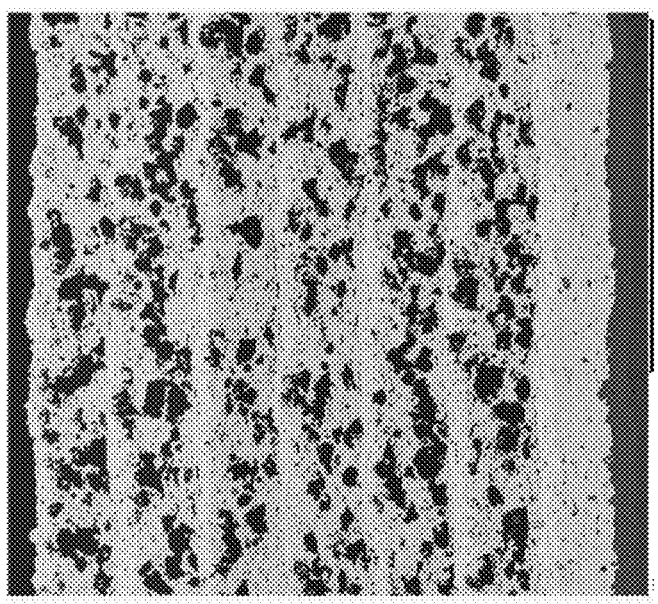
Figure 6B:
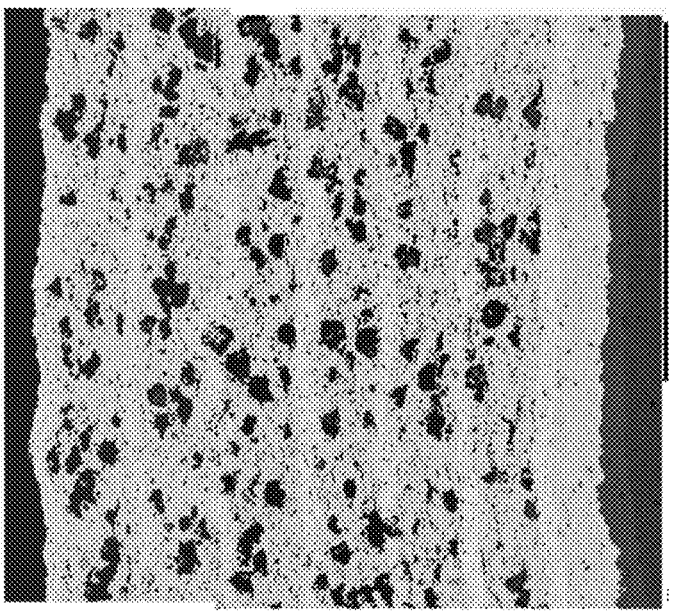

Steam cycling was then carried out on the samples. The steam cycling included 600 total cycles alternating between 1 hour at 1316 degrees Celsius in a 90% steam/10% air environment and 15 minutes at room temperature. More specifically, after each one hour cycles at 1316 degrees Celsius, the samples were set outside the furnace (ambient air, room temperature) for 15 minutes. The sample temperature dropped from 1316 Celsius to below 100 degrees Celsius in this time period. FIG. 5 is a SEM image of one of the samples after steam cycling. As shown, no spallation, no damage and no cracking were observed in the coating system after the steam cycling.

Another set of samples was prepared with example coatings on a CMC substrate. Two samples are shown in FIGS. 6A, 6B, 7A, and 7B, which are SEM images of the cross-sections, with 6B and 7B being magnified views of 6A and 7A, respectively. Each coating had an arrangement of Type B composition layers with Type D composition layers. The Type B composition layers had a thickness of about 8 mils. The Type D composition layers had a thickness of about 2 mils. In the sample shown in FIGS. 6A and 6B, polyester fugitive material was added to provide for a porosity of about 24% in the Type B layers. In the sample show in FIGS. 7A and 7B, polyester fugitive material was added to provide for a porosity of about 35% in the Type B layers. For the samples shown in FIGS. 6A, 6B, 7A, and 7B, the layers were plasma sprayed and then heat treated 3.5 hours at 500 degrees Celsius to remove the fugitive material, then heat treated 2 hours at 1200 degrees Celsius to crystalize the amorphous phase It was believed that multiple interfaces formed between the layers would provide for improved crack resistance (e.g., by stopping crack propagation through the entire coating).

Figure 8:
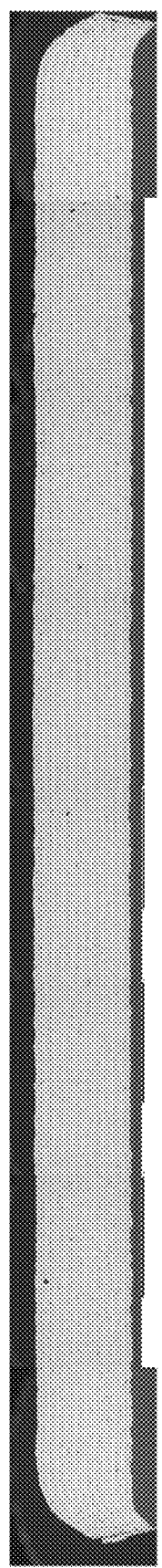
Figure 9:
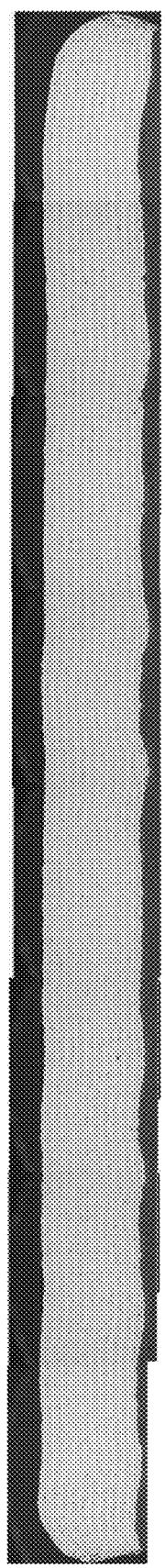
Figure 10:
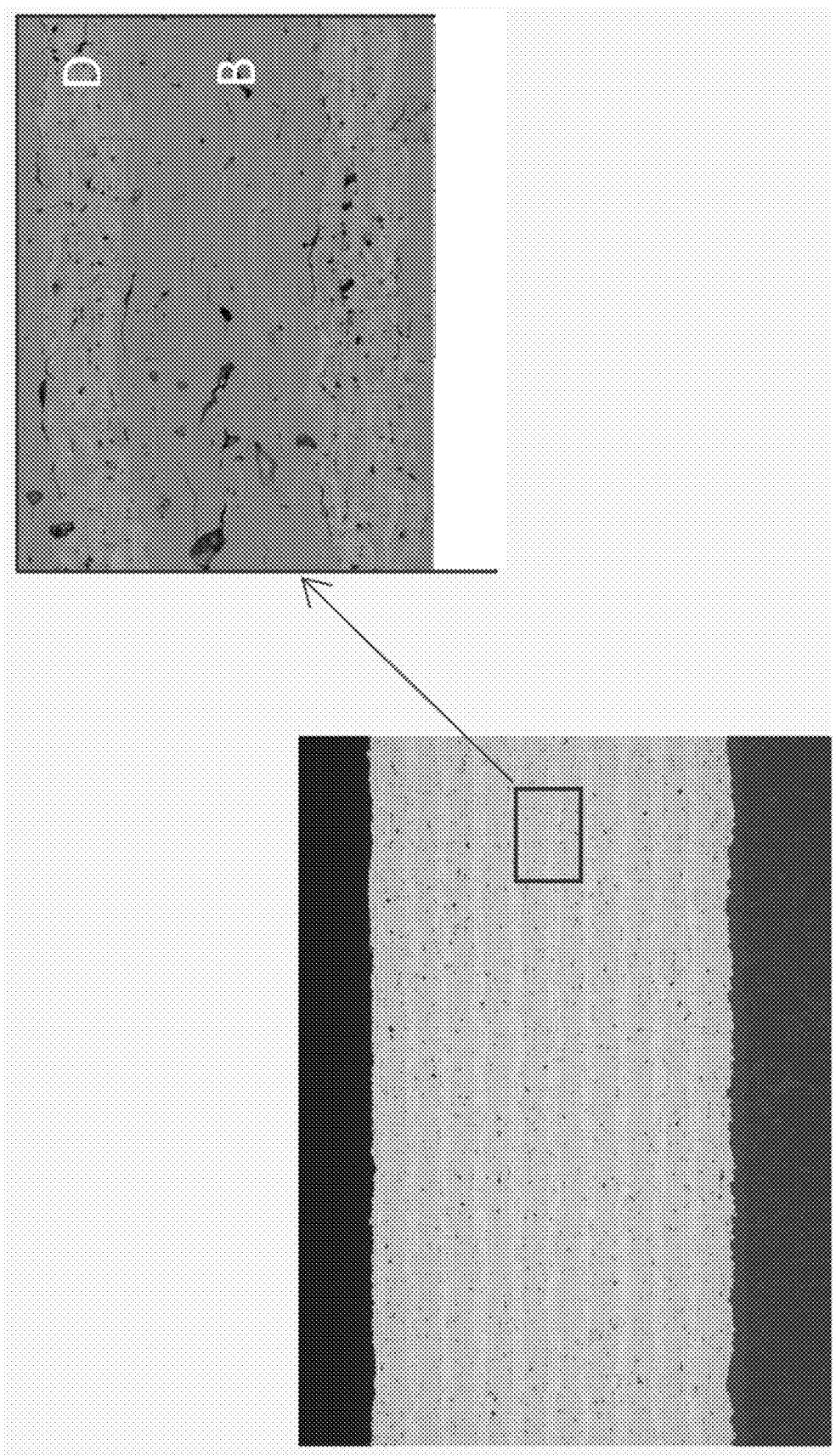

Another series of samples were formed. The coatings included a silicon bond layer on the substrates, followed by an EBC layer, followed by a Type D layer of 2 mils, followed by a Type B layer of 4 mils, with continued alternation under a total thickness of 62 mils was reached with the Type D layer being the topcoat. The Type D layers has a porosity of 4% and the Type B had a porosity of 1.8%. The coating was heat treated for 2 hours at 1200 degrees Celsius. The total thickness of the Type D layers was more than 15 mils thick without forming through coating thickness microcracks. FIG. 8 is a SEM image of the coating on a CMC substrate. FIG. 9 is a SEM image of the coating on a RBSiC substrate. FIG. 10 is a SEM image of a portion of a sample having the same coating architecture with a magnified portion showing the individual Type D and Type B layers.

Another sample was formed with a coating on a RBSiC substrate. The coating includes a 16 mil Type B layer, followed by a 2 mil Type D layer, followed by 4 mil Type B layers alternating with 2 mil Type D layers until a total of 43 mil alternating layer coating was formed with a Type D top layer.

Figure 11:
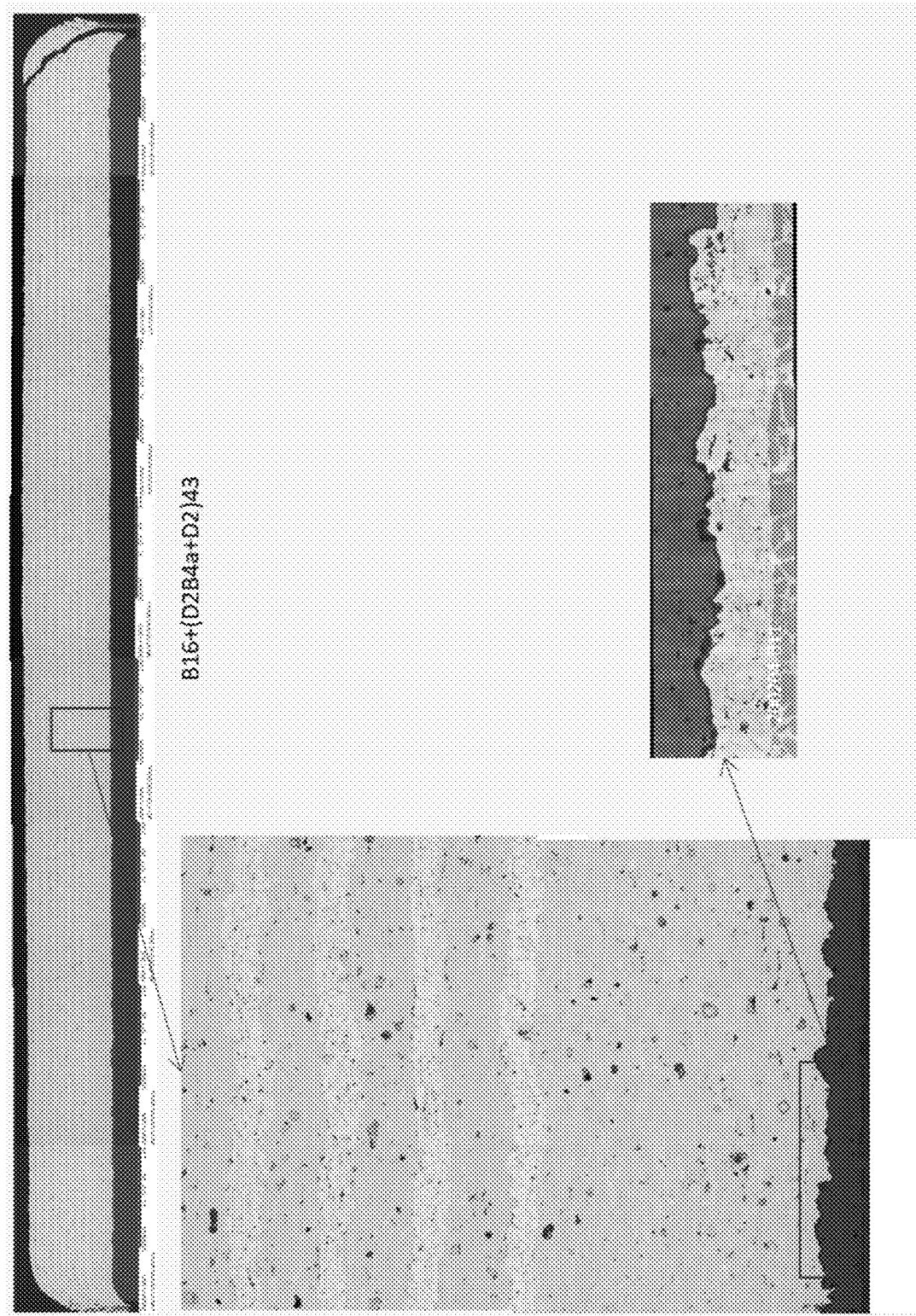

Steam cycling was then carried out on the sample. The steam cycling included 600 total cycles alternating between 1 hour at 1316 degrees Celsius in a 90% steam/10% air environment and 15 minutes at room temperature. More specifically, after each one hour cycles at 1316 degrees Celsius, the samples were set outside the furnace (ambient air, room temperature) for 15 minutes. The sample temperature dropped from 1316 Celsius to below 100 degrees Celsius in this time period. FIG. 11 shows SEM images of the samples after steam cycling. No spallation and coating damage was found after the cyclic steam testing. The thermally grown oxide (TGO) on the silicon bond coat had a thickness ~3.5±3.0 µm. The thickness of TGO was an indicator of coatings oxidation resistance, e.g., with thinner TGO under a certain amount of cycles reflecting better oxidation resistance for the coating (e.g., where a thick TGO reflects that the coating allows more oxygen to infiltrate and react with silicon bond coat). In this case, the 3.5 µm thick TGO that was observed indicated that the coating had good hermeticity.

Another sample was formed with a coating having an alternating arrangement of Type B (with 1.8% porosity) and Type D (with 4% porosity) layers on a RBSiC substrate. Cyclic testing was carried out on the sample to evaluate the CMAS resistance of the coating. The cyclic CMAS testing was implemented in air furnace. The test conditions were 1316 degrees Celsius for 200 cycles (1 hour hot, 15 min cool in ambient air) in air. CMAS with a chemistry 31.4 CaO-11.5 MgO-6.6 $Al_2O_3$-50.2 $SiO_2$ (in mol %) was applied on top of the coating at a loading rate about 1 mg/$cm^2$ every 25 cycles. Accordingly, the total loading was 8 mg/$cm^2$.

Figure 12:
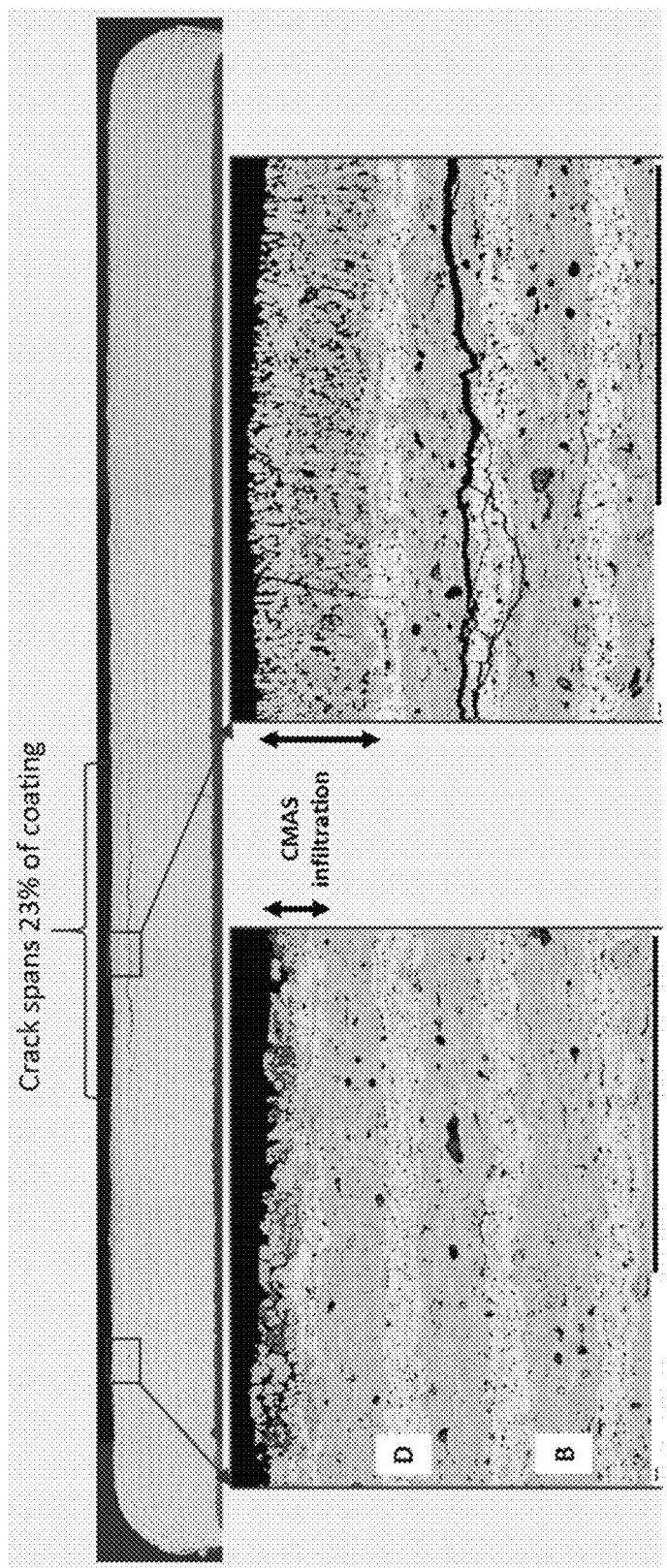

FIG. 12 are SEM images showing cross-sections of the sample after the cyclic testing. As shown, after 200 cycles with a total 8 mg/$cm^2$ CMAS loading, the coating demonstrated decent CMAS resistance, the infiltration was contained within near surface layers, and the majority of the coating body was intact.

Various examples have been described. These and other examples are within the scope of the following claims and clauses.

Clause 1. An article comprising: a ceramic or ceramic matrix composite (CMC) substrate; and an abradable coating on the CMC substrate, the abradable coating comprising a plurality of first rare earth (RE) silicate layers in an alternating arrangement with a plurality of second RE silicate layers, wherein the first RE silicate layers include a rare earth monosilicate and the second RE silicate layers include a rare earth disilicate, and wherein the first RE silicate layers include a greater concentration of the rare earth monosilicate than the second RE silicate layers.

Clause 2. The article of clause 1, wherein the first RE silicate layers include at least about 20 wt. % rare earth monosilicate and the second RE silicate layers include at least about 50 wt. % of the rare earth disilicate.

Clause 3. The article of clause 1 or clause 2, wherein the first RE silicate layers includes the rare earth monosilicate with a remainder being the rare earth disilicate.

Clause 4. The article of any one of clauses 1-3, wherein the alternating arrangement of the first RE silicate layers and the second RE silicate layers comprises about 2 to about 100 layers.

Clause 5. The article of any one of clauses 1-4, wherein a total thickness of the abradable coating is between about 250 micrometers and about 2500 micrometers.

Clause 6. The article of any one of clauses 1-5, wherein the rare earth disilicate comprises ytterbium disilicate (YbDS), and the rare earth monosilicate comprises ytterbium monosilicate (YbMS).

Clause 7. The article of clause 6, wherein the first RE silicate layers comprise at least about 20 wt % of YbMS and the second RE silicate layers comprise at least about 50 wt % of YbDS.

Clause 8. The article of clause 7, wherein the second RE silicate layers consists essentially of YbDS.

Clause 9. The article of clause 7, wherein the second RE silicate layers includes at least about 50 wt % of YbDS and a remainder of YbMS.

Clause 10. The article of any one of clauses 1-9, further comprising a bond coat on at least a portion of the substrate, wherein the abradable coating is on the bond coat.

Clause 11. The article of clause 10, wherein the bond coat comprises Si.

Clause 12. The article of clause 10, further comprising an environmental barrier coating (EBC) between the bond coat and the abradable coating.

Clause 13. The article of clause 12, wherein the EBC is a hermetic EBC comprising the rare earth disilicate and the rare earth monosilicate.

Clause 14. The article of any of clauses 1-13, wherein the second RE silicate layers exhibit a porosity greater than a porosity of the first RE silicate layers.

Clause 15. The article of any of clauses 1-14, wherein at least one of: one or more of the first RE silicate layers and/or the second RE silicate layer has a porosity of about 60% or less, or each of the first RE silicate layers and each of the second RE silicate layers has a porosity of about 60% or less.

Clause 16. A method comprising forming an abradable coating on a ceramic or CMC substrate, the abradable coating comprising a plurality of first rare earth (RE) silicate layers in an alternating arrangement with a plurality of second RE silicate layers, wherein the first RE silicate layers include a rare earth monosilicate and the second RE silicate layers include a rare earth disilicate, and wherein the first RE silicate layers include a greater concentration of the rare earth monosilicate than the second RE silicate layers.

Clause 17. The method of clause 15, wherein forming the abradable coating on the ceramic or CMC substrate comprising depositing the plurality of first rare earth (RE) silicate layers in the alternating arrangement with the plurality of second RE silicate layers using a thermal spray process.

Clause 18. The method of clause 15, wherein the thermal spray process includes a plasma spray process.

Clause 19. The method of any one of clauses 15-17, wherein the thermal spray process includes thermal spraying a rare earth disilicate powder to form both the first RE silicate layers and the second RE silicate layers, wherein the concentration of the rare earth monosilicate in the first RE silicate layers is controlled by controlling heat of the thermal spray process to burn an amount of silica from the rare disilicate powder.

Clause 20. The method of any one of clauses 15-19, wherein the first RE silicate layers include at least about 20 wt. % rare earth monosilicate and the second RE silicate layers include at least about 50 wt. % of the rare earth disilicate.

Clause 21. The method of any one of clauses 15-20, wherein the first RE silicate layers includes the rare earth monosilicate with a remainder being the rare earth disilicate.

Clause 22. The method of any one of clauses 15-21, wherein the alternating arrangement of the first RE silicate layers and the second RE silicate layers comprises about 2 to about 100 layers.

Clause 23. The method of any one of clauses 15-22, wherein a total thickness of the abradable coating is between about 250 micrometers and about 2500 micrometers.

Clause 24. The method of any one of clauses 15-23, wherein the rare earth disilicate comprises ytterbium disilicate (YbDS), and the rare earth monosilicate comprises ytterbium monosilicate (YbMS).

Clause 25. The method of clause 24, wherein the first RE silicate layers comprise at least about 20 wt % of YbMS and the second RE silicate layers comprise at least about 50 wt % of YbDS.

Clause 26. The method of clause 25, wherein the second RE silicate layers consists essentially of YbDS.

Clause 27. The method of clause 25, wherein the second RE silicate layers includes at least about 50 wt % of YbDS and a remainder of YbMS.

Clause 28. The method of any one of clauses 15-27, further comprising a bond coat on at least a portion of the substrate, wherein the abradable coating is on the bond coat.

Clause 29. The method of clause 28, wherein the bond coat comprises Si.

Clause 30. The method of clause 28, further comprising an environmental barrier coating (EBC) between the bond coat and the abradable coating.

Clause 31. The method of clause 30, wherein the EBC is a hermetic EBC comprising the rare earth disilicate and the rare earth monosilicate.

Clause 32. The method of any of clauses 15-31, wherein the second RE silicate layers exhibit a porosity greater than a porosity of the first RE silicate layers.

Clause 33. The method of any of clauses 15-32, wherein at least one of: one or more of the first RE silicate layers and/or the second RE silicate layer has a porosity of about 60% or less, or each of the first RE silicate layers and each of the second RE silicate layers has a porosity of about 60% or less.

Clause 34. An abradable system comprising: a ceramic or CMC substrate, and an abradable coating on the CMC substrate, the abradable coating comprising a plurality of first rare earth (RE) silicate layers in an alternating arrangement with a plurality of second RE silicate layers, wherein the first RE silicate layers include a rare earth monosilicate and the second RE silicate layers include a rare earth disilicate, wherein the first RE silicate layers include a greater concentration of the rare earth monosilicate than the second RE silicate layers; and an opposing abrasive element acting on the abradable coating, wherein the abrasive element has a maximum penetration depth in the abradable coating, and wherein the abradable coating comprises at least one of the first RE silicate layer between the maximum penetration depth and the CMC substrate.

Clause 35. The system of clause 34, wherein the rare earth monosilicate comprises ytterbium monosilicate (YbMS) and the rare earth disilicate comprises ytterbium disilicate (YbDS).

Clause 36. The system of clause 34 or clause 35, wherein the alternating arrangement of the first and the second discrete layers comprises about 2 to about 100 layers.

Clause 1A. An article comprising a ceramic or ceramic matrix composite (CMC) substrate; and an abradable coating on the CMC substrate, the abradable coating comprising a first discrete layer rich in a rare-earth (RE) monosilicate and a second discrete layer rich in a RE disilicate.

Clause 2A. The article of clause 1A, wherein the abradable coating comprises an alternating arrangement of a plurality of the first discrete layers and a plurality of the second discrete layers.

Clause 3A. The article of clause 2A, wherein the arrangement of the first and the second discrete layers comprises about 2 to about 100 layers.

Clause 4A. The article of clause 2A, wherein the arrangement of the first and the second discrete layers comprises about 4 to about 10 layers.

Clause 5A. The article of clause 1A, wherein a total thickness of the abradable coating is between about 250 micrometers and about 1500 micrometers.

Clause 6A. The article of clause 1A, wherein the RE disilicate comprises ytterbium disilicate (YbDS), and the RE monosilicate comprises ytterbium monosilicate (YbMS).

Clause 7A. The article of clause 6A, wherein the first discrete layer comprises greater than about 20 wt % of YbMS and the second discrete layer comprises greater than about 50 wt % of YbDS.

Clause 8A. The article of clause 7A, wherein the second discrete layer consists essentially of YbDS.

Clause 9A. The article of clause 8A, wherein the first discrete layer consists essentially of one of YbMS, yttrium monosilicate or yttrium disilicate.

Clause 10A. The article of clause 1A, further comprising a bond coat on at least a portion of the substrate, wherein the abradable coating is on the bond coat.

Clause 11A. The article of clause 10A, wherein the bond coat comprises Si.

Clause 12A. The article of clause 10A, further comprising an environmental barrier coating (EBC) between the bond coat and the abradable coating.

Clause 13A. The article of clause 12A, wherein the EBC is a hermetic EBC comprising RE disilicate and RE monosilicate.

Clause 14A. A method comprising forming an abradable coating on at least a portion of a CMC substrate, wherein the abradable coating comprises an alternating arrangement of at least two discrete RE monosilicate and RE disilicate layers, the alternating arrangement comprising a plurality of first layers rich in RE monosilicate and a plurality of second layers rich in RE rare-earth disilicate, and wherein the first layers are closest to the CMC substrate.

Clause 15A. The method of clause 14A, wherein the RE monosilicate layers comprise ytterbium monosilicate (YbMS) and the RE disilicate layers comprise ytterbium disilicate (YbDS).

Clause 16A. The method of clause 15A, wherein forming the first layers of the abradable coating comprises controlling a thermal spray composition comprising YbDS such that a predetermined portion of the YbDS in the thermal spray composition disassociates into YbMS.

Clause 17A. An abradable system, comprising a CMC substrate, and an abradable coating on the CMC substrate, wherein the abradable coating comprises an alternating arrangement of a plurality of first layers comprising at least 60 wt % of a RE monosilicate and a plurality of second layers comprising at least 60 wt % of a RE disilicate, and wherein the first layers are closest to the CMC substrate; and an opposing abrasive element acting on the abradable coating, wherein the abrasive element has a maximum penetration depth in the abradable coating, and wherein the abradable coating comprises at least one first layer between the maximum penetration depth and the CMC substrate.

Clause 18A. The system of clause 17A, wherein the RE monosilicate layers comprise ytterbium monosilicate (YbMS) and the RE disilicate layers comprise ytterbium disilicate (YbDS).

Clause 19A. The system of clause 17A, wherein the alternating arrangement of the first and the second discrete layers comprises about 2 to about 100 layers.

What is claimed is:

1. A system comprising:
    a ceramic or ceramic matrix composite (CMC) substrate;
    an abradable coating on the CMC substrate, the abradable coating comprising a plurality of first rare earth (RE) silicate layers in an alternating layer arrangement with a plurality of second RE silicate layers such that the abradable coating includes a first layer, a second layer, a third layer, a fourth layer, and a fifth layer, in that order, on the ceramic or the CMC substrate with the fifth layer being located between the fourth layer and the ceramic or the CMC substrate,
    wherein the plurality of first RE silicate layers includes the first layer, the third layer, and the fifth layer,
    wherein the plurality of second RE silicate layers includes the second layer and the fourth layer,
    wherein the first RE silicate layers include a rare earth monosilicate and the second RE silicate layers include a rare earth disilicate, and wherein the first RE silicate layers include a greater concentration of the rare earth monosilicate than the second RE silicate layers; and
    an opposing abrasive element configured to abrade the abradable coating to a maximum penetration depth such that at least the first layer and the third layer of the plurality of first RE silicate layers and at least the second layer and the fourth layer of the plurality of second RE silicate layers are abraded by the opposing abrasive element, and the fifth layer of the plurality of first RE silicate layers is between the substrate and the maximum penetration depth such that the fifth layer of the plurality of first RE silicate layers defines a continuous and undisturbed CMAS resistant barrier layer over the CMC substrate after the opposing abrasive element abrades to the maximum penetration depth,
    wherein the first layer, the third layer, and the fifth layer of the plurality of first RE silicate layers each include at least about 20 wt. % rare earth monosilicate, and wherein the second layer and the fourth layer of the plurality of second RE silicate layers each include at least about 50 wt. % of the rare earth disilicate,
    wherein a thickness of each of the first layer, the third layer, and the fifth layer is less than a thickness of each of the second layer and the fourth layer, and
    wherein a porosity of each of the second layer and the fourth layer is greater than a porosity of each of the first layer, the third layer, and the fifth layer.

2. The system of claim 1, wherein the first RE silicate layers, including the first layer, third layer, and fifth layer, includes the rare earth monosilicate with a remainder being the rare earth disilicate.

3. The system of claim 1, wherein the alternating arrangement of the first RE silicate layers and the second RE silicate layers comprises about 5 to about 100 layers.

4. The system of claim 1, wherein a total thickness of the abradable coating is between about 250 micrometers and about 2500 micrometers.

5. The system of claim 1, wherein the rare earth disilicate comprises ytterbium disilicate (YbDS), and the rare earth monosilicate comprises ytterbium monosilicate (YbMS).

6. The system of claim 5, wherein the first RE silicate layers, including the first layer, third layer, and fifth layer, comprise at least about 20 wt % of YbMS and the second RE silicate layers comprise at least about 50 wt % of YbDS.

7. The system of claim 6, wherein the second RE silicate layers, including the second layer and fourth layer, consists essentially of YbDS.

8. The system of claim 6, wherein the second RE silicate layers, including the second layer and fourth layer, includes at least about 50 wt % of YbDS and a remainder of YbMS.

9. The system of claim 1, further comprising a bond coat on at least a portion of the substrate, wherein the abradable coating is on the bond coat.

10. The system of claim 9, wherein the bond coat comprises Si.

11. The system of claim 9, further comprising an environmental barrier coating (EBC) between the bond coat and the abradable coating.

12. The system of claim 11, wherein the EBC is a hermetic EBC comprising the rare earth disilicate and the rare earth monosilicate.

13. The system of claim 1, wherein the abradable coating includes an outer layer defining an outer surface of the abradable coating, wherein the outer layer is the first layer of the plurality of first RE silicate layers.

14. The system of claim 1, wherein the plurality of first rare earth (RE) silicate layers in the alternating arrangement with the plurality of second RE silicate layers reduces thermal stress on the abradable coating compared to a similar abradable coating having a similar amount of material but having only a one or two layer structure.

15. The system of claim 1, wherein the plurality of first rare earth (RE) silicate layers in the alternating arrangement with the plurality of second RE silicate layers reduces crack propagation through the abradable coating compared to a similar abradable coating having a similar amount of material but having only a one layer structure.

16. The system of claim 1, wherein the thickness of each of the second layer and the fourth layer is at least twice the thickness of each of the first layer, the third layer, and the fifth layer.

17. The system of claim 1, wherein the first layer is directly on the second layer, wherein the second layer is directly on the third layer, and wherein the third layer is directly on the fourth layer.

18. The system of claim 1, wherein the porosity of each of the first layer, the third layer, and the fifth layer is about 5 percent or less, and wherein the porosity of each of the second layer and the fourth layer is about 10 percent or greater.

19. A system comprising:
a ceramic or ceramic matrix composite (CMC) substrate;
an abradable coating on the CMC substrate, the abradable coating comprising a plurality of first rare earth (RE) silicate layers in an alternating layer arrangement with a plurality of second RE silicate layers such that the abradable coating includes a first layer, a second layer, a third layer, a fourth layer, and a fifth layer, in that order, on the ceramic or the CMC substrate with the fifth layer being located between the fourth layer and the ceramic or the CMC substrate,
wherein the plurality of first RE silicate layers includes the first layer, the third layer, and the fifth layer,
wherein the plurality of second RE silicate layers includes the second layer and the fourth layer,
wherein the first RE silicate layers include a rare earth monosilicate and the second RE silicate layers include a rare earth disilicate, and wherein the first RE silicate layers include a greater concentration of the rare earth monosilicate than the second RE silicate layers; and
an opposing abrasive element configured to abrade the abradable coating to a maximum penetration depth such that at least the first layer and the third layer of the plurality of first RE silicate layers and at least the second layer and the fourth layer of the plurality of second RE silicate layers are abraded by the opposing abrasive element, and the fifth layer of the plurality of first RE silicate layers is between the substrate and the maximum penetration depth such that the fifth layer of the plurality of first RE silicate layers defines a continuous and undisturbed CMAS resistant barrier layer over the CMC substrate after the opposing abrasive element abrades to the maximum penetration depth,
wherein the first layer, the third layer, and the fifth layer of the plurality of first RE silicate layers each include at least about 20 wt. % rare earth monosilicate, and wherein the second layer and the fourth layer of the plurality of second RE silicate layers each include at least about 50 wt. % of the rare earth disilicate,
wherein a thickness of each of the first layer, the third layer, and the fifth layer is less than a thickness of each of the second layer and the fourth layer,
wherein a porosity of each of the second layer and the fourth layer is greater than a porosity of each of the first layer, the third layer, and the fifth layer,
wherein the plurality of first rare earth (RE) silicate layers in the alternating arrangement with the plurality of second RE silicate layers reduces thermal stress on the abradable coating compared to a similar abradable coating having a similar amount of material but having only a one or two layer structure, and
wherein the plurality of first rare earth (RE) silicate layers in the alternating arrangement with the plurality of second RE silicate layers reduces crack propagation through the abradable coating compared to a similar abradable coating having a similar amount of material but having only a one layer structure.

20. A method comprising:
forming an abradable coating on a ceramic or CMC substrate, the abradable coating comprising a plurality of first rare earth (RE) silicate layers in an alternating layer arrangement with a plurality of second RE silicate layers such that the abradable coating includes a first layer, a second layer, a third layer, a fourth layer, and a fifth layer, in that order, on the ceramic or the CMC substrate with the fifth layer being located between the fourth layer and the ceramic or the CMC substrate,
wherein the plurality of first RE silicate layers includes the first layer, the third layer, and the fifth layer,
wherein the plurality of second RE silicate layers includes the second layer and the fourth layer,
wherein the first RE silicate layers include a rare earth monosilicate and the second RE silicate layers include a rare earth disilicate, and wherein the first RE silicate layers include a greater concentration of the rare earth monosilicate than the second RE silicate layers; and abrading, via an opposing abrasive element, the abradable coating to a maximum penetration depth such that least the first layer and the third layer of the plurality of first RE silicate layers and at least the second layer and the fourth layer of the plurality of second RE silicate layers are abraded by the opposing abrasive element, and the fifth layer of the plurality of first RE silicate layers is between the substrate and the maximum penetration depth such that the fifth layer of the plurality of first RE silicate layers defines a continuous and undisturbed CMAS resistant barrier layer over the CMC substrate after the opposing abrasive element abrades to the maximum penetration depth, wherein the first layer, the third layer, and the fifth layer of the plurality of first RE silicate layers each include at least about 20 wt. % rare earth monosilicate, and wherein the second layer and the fourth layer of the plurality of second RE silicate layers each include at least about 50 wt. % of the rare earth disilicate, wherein a thickness of each of the first layer, the third layer, and the fifth layer is less than a thickness of each of the second layer and the fourth layer, and wherein a porosity of each of the second layer and the fourth layer is greater than a porosity of each of the first layer, the third layer, and the fifth layer.

\* \* \* \* \*